July 5, 1932.  R. C. MOUNTZ  1,866,480
FOUR-WHEEL BRAKE MECHANISM
Filed May 22, 1929  3 Sheets-Sheet 1
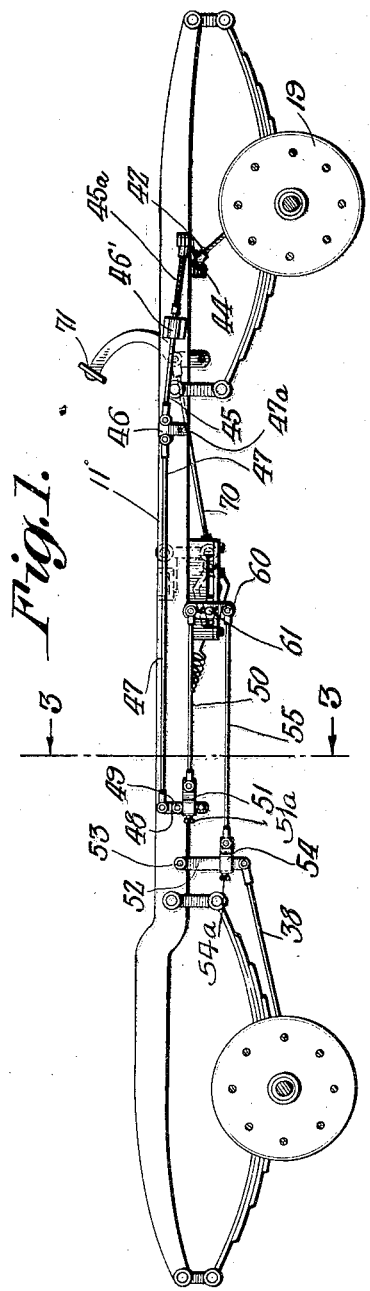
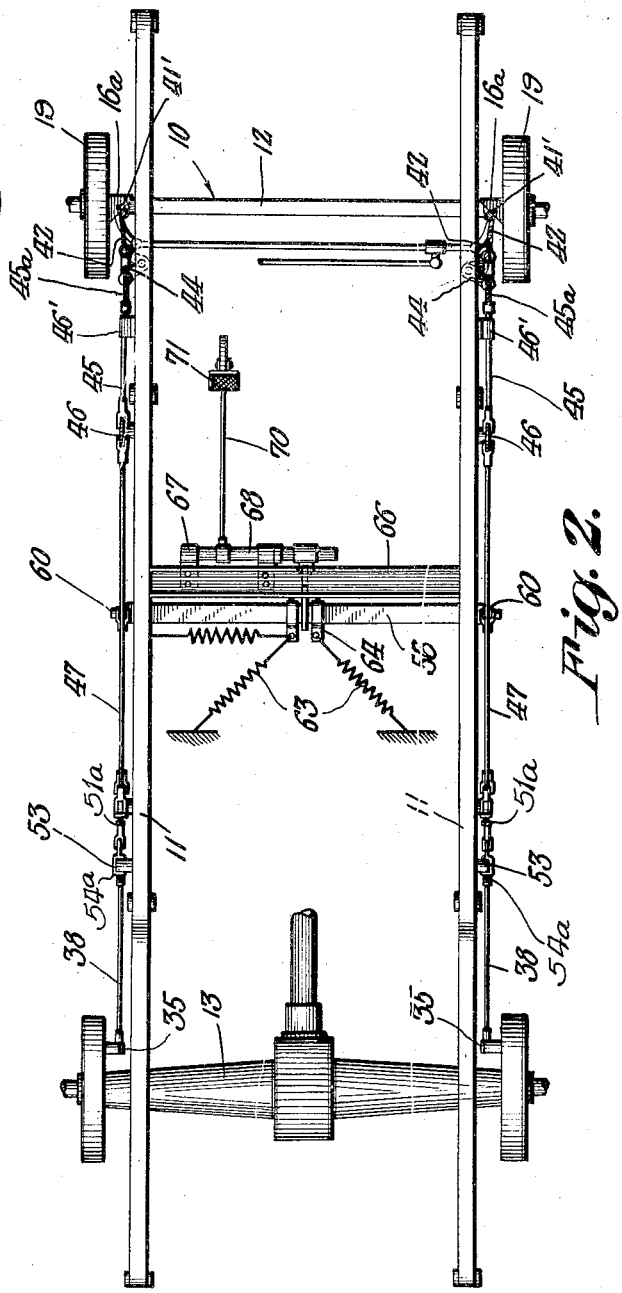
Inventor
R. C. Mountz
By L. F. Randolph Jr.
Attorney

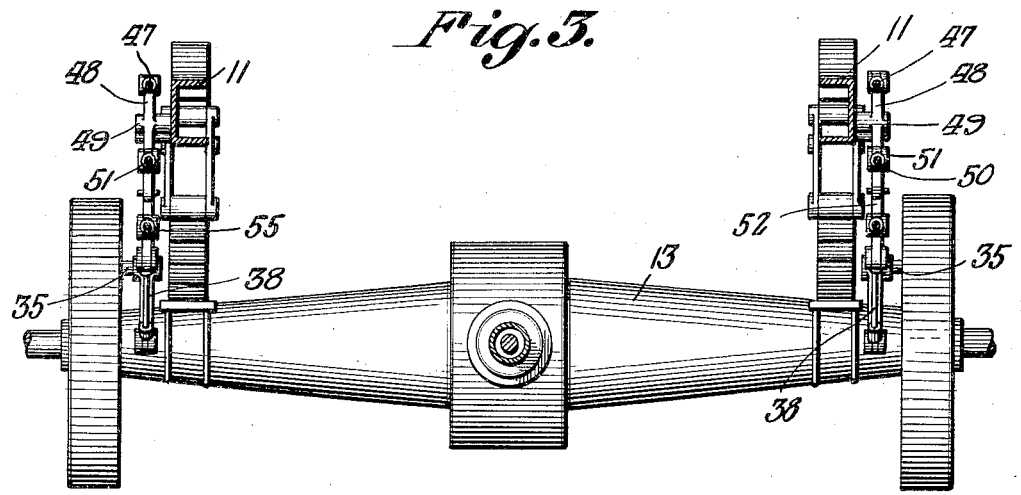
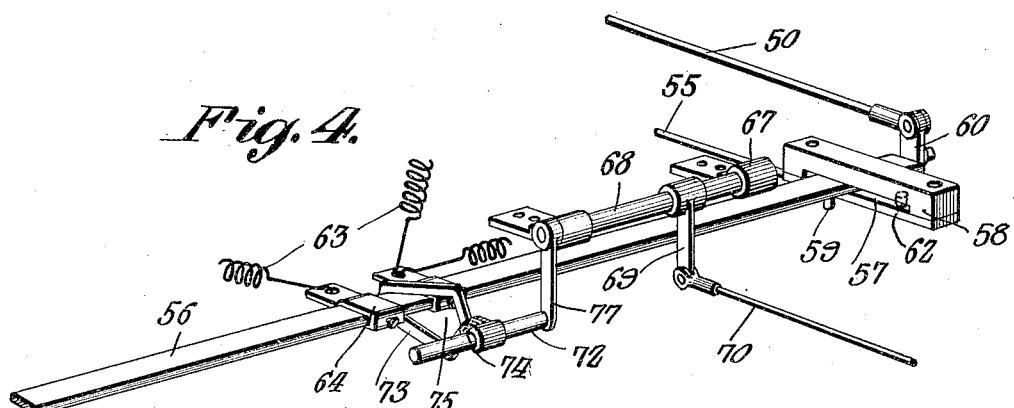
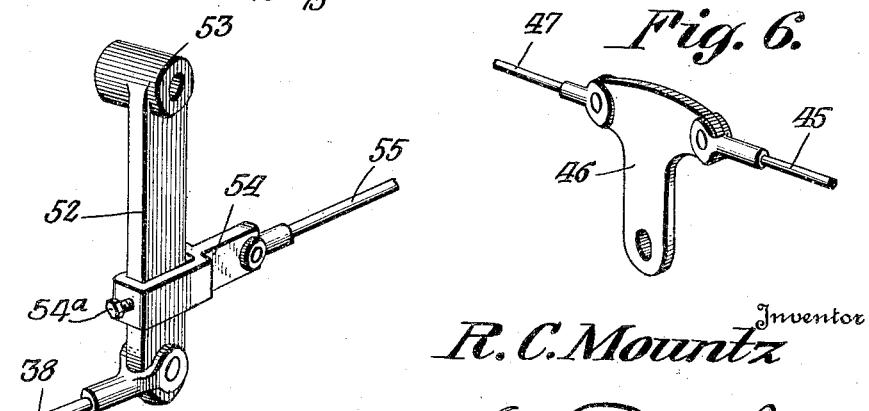

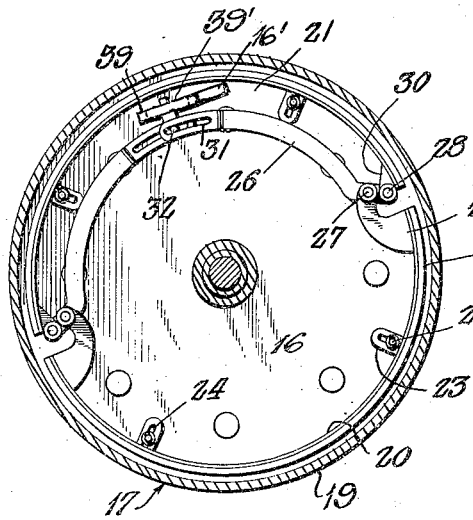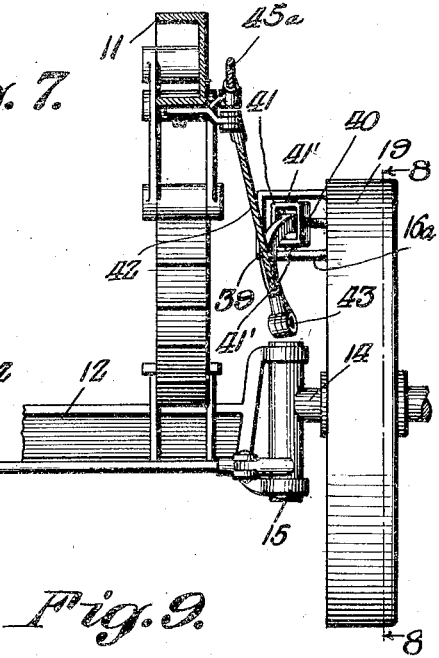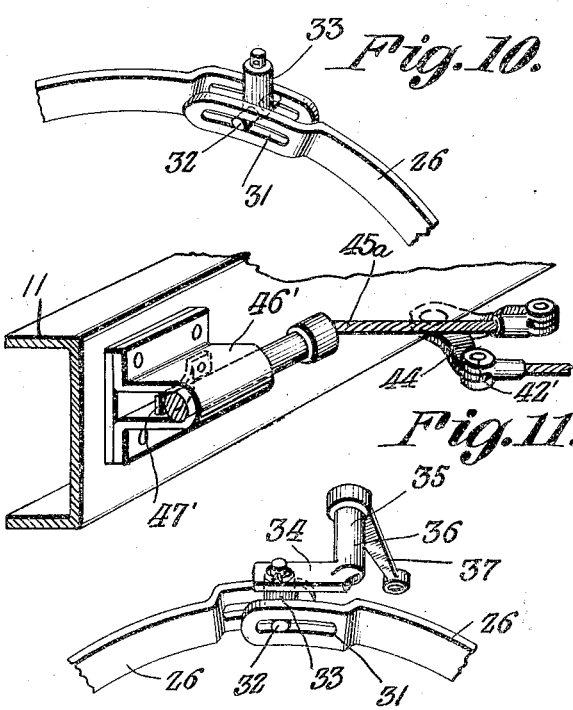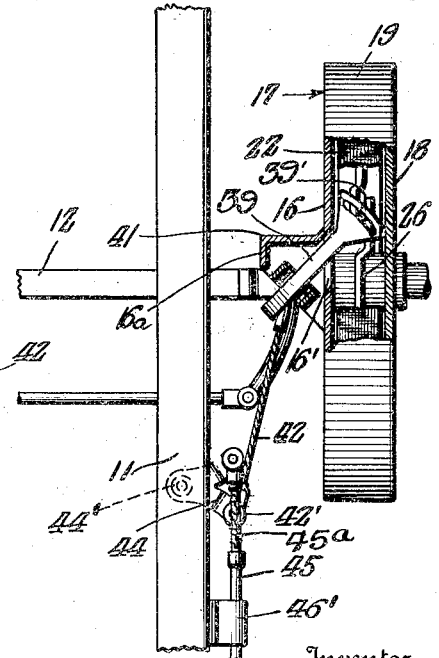

Patented July 5, 1932

1,866,480

UNITED STATES PATENT OFFICE

RAY C. MOUNTZ, OF ALTOONA, PENNSYLVANIA

FOUR WHEEL BRAKE MECHANISM

Application filed May 22, 1929. Serial No. 365,120.

This invention relates to brake mechanism and aims to provide a novel construction whereby brakes for four wheels, operable from a common source, are equalized, and to provide a novel construction of brake per se applicable to one or more wheels.

A prime object is to provide such a construction that should the mechanism for one wheel break, the three remaining mechanisms will continue to operate or if both brakes of one side of a vehicle should fail to operate, those of the other side will be unimpaired and will efficiently operate.

Various additional objects and advantages are accomplished by the invention and will in part be pointed out hereinafter and otherwise become apparent from a consideration of the accompanying drawings and ensuing description thereof.

In said drawings:—

Figure 1 is a view in side elevation showing my improved brake mechanism in connection with an automobile chassis, Figure 2 is a plan view of the parts of Figure 1, Figure 3 is a cross sectional view taken on the line 3—3 of Figure 1, Figure 4 is a detail perspective view illustrating part of the equalizer device, Figure 5 is a detail perspective view of one of the link hangers and connection, Figure 6 is a detail perspective view of the connector for the front brake link, Figure 7 is an enlarged elevation of one of the front wheels of the vehicle and associated brake mechanism in part, Figure 8 is a detail section taken on the line 8—8 of Figure 7, Figure 9 is a plan view, partly broken away to disclose details of the parts shown in Figure 7, Figure 10 is a detail perspective view of parts of the operating connection for the brake shoes, Figure 11 is a detail perspective view illustrating one of the guides for the front brake link, and Figure 12 is a detail perspective view similar to Figure 10 showing in addition the actuating crank or lever.

Referring specifically to the drawings, an automobile chassis is conventionally shown as at 10 to give an idea of the application and operation of my invention and the same has usual side beams as at 11, connected in any suitable way forming no part of the present invention.

The front and rear axles of the vehicle are shown at 12 and 13, respectively, the former having the usual stub axles at 14 mounted to swing on substantially vertical axes 15. Fastened in any suitable way to the axles 14 and 13, are fixed plates 16 about which rotate brake drums 17, carried one by each wheel of the vehicle as usual, such drums 17 consisting of plates 18 having circumferential flanges 19 thereon.

Engageable with the inner surfaces of the flanges 19 are brake shoes 20 and 21, as best shown in Figure 8, such shoes preferably being lined with usual lining 22. Guide lugs 23 extend from the brake shoes and have elongated or radial slots 24 in which studs 25 are disposed, extending rigidly from the plates 16. Thus the brake shoes are mounted for radial movement into and out of engagement with the brake bands 19, being normally urged and held away from such bands or flanges 19 as usual and by means hereinafter described. In order to actuate the shoes 20, a pair of arcuate levers 26 are provided which are pivoted at 27 and 28, respectively, to lugs 29 and 30 on the shoes 20 and 21. The inner ends of such levers 26 overlap and have elongated slots at 31 occupied by pins 32 of an actuating stud 33.

Different means are provided for actuating the shoes of the front and rear brake drums. In the case of the rear brake drums, the actuating studs 33 have one arm 34 of bell crank levers 35 loosely connected thereto, which levers have journals 36 pivotally mounted in the adjacent fixed plates 16. The other arms 37 of the bell crank levers 35 have draw links 38 loosely or pivotally connected thereto.

In the case of the brake devices of the front drums, levers 39 extend through suitably enlarged holes 16' in the adjacent fixed plates 16 and are loosely connected by arcuate slots and pins at 39' to the adjacent operating studs 33. Such levers 39 are fulcrumed on diagonal axes by means of pins 40, which are journaled in swivel brackets 41 pivoted by vertical trunnions 41' to extensions 16ª of the plates 16.

It will be realized that movement of the studs 33 toward the axis of the drum will apply the shoes 20 and 21 and that the opposite movement will release them. To this end, cables or flexible elements 42 are suitably fastened at 43 to the levers 39. Such cables 42 are fastened at 42' to one arm of bell crank levers 44 pivoted on the side beams 11 at 44'.

The other arm of levers 44 have the links 45 suitably fastened thereto by cables 45ª. Such links pass through guide devices 46' fastened to the side beams 11 and which links 45 are held against rattling by spring fingers 47' carried by such guide devices. Links 45 at their rear ends are pivoted to yokes 46 pivoted at 47ª to the side beams and have link devices 47 pivoted thereto which are also pivoted to levers 48 fulcrumed at 49 on the side beams 11. Adjustably fastened to the levers 48 on the opposite sides of their fulcrum to the links 47 are links 50, the adjustable connection being shown at 51 secured in place by set screws 51ª and enabling slack, play or wear to be taken up.

The links 38 for the rear wheel brake means are pivotally connected to hangers 52 pivoted at 53 to the side beams 11 and adjustably fastened thereto by brackets 54 and set screws 54ª are links 55, such adjustable connections 54 enabling slack, play or wear to be taken up.

In order to equalize the action of the brakes on each of the four wheels or brake drums, an equalizer bar is provided at 56 which has a limited sliding movement bodily longitudinally of the side beams 11 in slots 57 of sectional brackets 58 fastened against the under surface of said side beams 11. Lateral displacement of side bar 56 is prevented by depending pins 59 thereon. At each end, bar 56 has a relatively short equalizing lever pivoted thereto at 61 to which the links 50 and 55 are pivotally connected on opposite sides of such fulcrum 61. Pins or abutments 62 in the slots 57, limit the movement of bar 56 incidental to application of the brakes. One or more coil springs 63 are fastened to brackets 64 on the equalizer bar 56 and to various parts of the automobile or chassis.

A cross beam 66 joins the side beams 11 adjacent to the equalizer bar 56 and has bearings 67 thereon journaling a rock shaft 68 to which a crank 69 is fixed, having a link 70 pivoted thereto which in turn is operable by brake pedal lever 71 of the automobile, depression of the pedal 71 serving to move the rod 70 forwardly.

Another crank 72 is fixed on rock shaft 68 and an open link 73 is pivoted thereto as at 74 and has the equalizer bar 56 extending loosely through its opening or space 75. The springs 63 urge the brakes to released position and also urge the brake pedal 71 to normal or released position.

As a result of the construction described, it will be seen that depression of the pedal or lever 71 will apply each of the brakes of the four wheels, equalizing the action through the movement of the equalizer bar 56 and the equalizer levers 60, the parts returning to normal position upon release through the action of the springs 63.

Particular attention is called to the fact that if one of the rods 50 or 55 breaks the lever 60 associated therewith would assume a horizontal position and accordingly the actuation of the pedal 71 would cause actuation of three brakes rather than two. Should both of the rods 50 and 55 at one side of the machine become disabled, the brake at the other side of the machine would operate efficiently because the movement of the equalizer bar at the impaired side of the vehicle, would be limited by the adjacent pin 62.

Various changes may be resorted to provided they fall within the spirit and scope of the invention.

I claim as my invention:—

1. In a braking mechanism of the class described, brakes for four wheels, mechanism for operating the brakes of the front wheels, mechanism for operating the brakes of the rear wheels, equalizer means connecting said mechanisms comprising an equalizer bar having a sliding movement longitudinally, spring means urging said bar to normal or retracted position, and a rock shaft having loose connection with said bar, said rock shaft being under control of the brake pedal and means to limit the sliding movement of the equalizing means so that in the event of breakage of either mechanism the disabled brake or brakes alone will be inactive.

2. A braking mechanism of the class described, brakes for four wheels, mechanism for operating the brakes of the front wheels, mechanism for operating the brakes of the rear wheels, equalizer means connecting said mechanisms comprising an equalizer bar having a sliding movement longitudinally, levers pivoted to the ends of said equalizer bar, and said mechanisms being connected to said levers on opposite sides of the fulcrum thereof brackets adjacent opposite ends of said equalizer bar mounting the equalizer bar, said brackets serving to limit the sliding movement of the equalizer bar so that in the event of breakage of either mechanism the disabled brake or brakes alone will be inactive.

3. In a braking mechanism of the class described, a slidable equalizer bar, means operable to slide the bar, normally substantially vertical levers pivoted to the ends of said bar, means pivoted to the levers to operate front wheel brakes, and means pivoted to the levers to operate the rear wheel brakes, said means being located on opposite sides of the fulcrums of said levers, said levers in the event of a link connected thereto becoming disabled being adapted to assume a substantially horizontal position for the purpose specified.

4. In a braking mechanism of the class described, a slidable equalizer bar, normally substantially vertical levers pivoted to said bar, links pivoted to said levers, second links pivoted to said levers, said first and second links being located on opposite sides of the fulcrums of said levers, and linkage extending from said links to operate front and rear wheel brakes, respectively, said levers in the event of a link connected thereto becoming disabled being adapted to assume a substantially horizontal position for the purpose specified.

5. In a braking mechanism of the class described, a slidable equalizer bar, normally substantially vertical levers pivoted to said bar, links pivoted to said levers, second links pivoted to said levers, said first and second links being located on opposite sides of the fulcrums of said levers, linkage extending from said links to operate front and rear brakes, respectively, said levers in the event of a link connected thereto becoming disabled being adapted to assume a substantially horizontal position for the purpose specified, brackets at the ends of said bar in which the same is slidably mounted, and pins on the brackets limiting the sliding movement of the bar so that in the event of breakage of linkage, the disabled brake or brakes alone connected thereto will remain inactive.

In testimony whereof I affix my signature.

RAY C. MOUNTZ.